United States Patent
Kodera et al.

[11] 3,716,478
[45] Feb. 13, 1973

[54] HYDROGENATION TREATMENT OF HYDROCARBON OIL

[75] Inventors: Yoshihide Kodera, Kanagawa-ken; Jun Kato, Meguro-ku, Tokyo; Kazuo Shimada, Kitaku, Tokyo; Morio Suzuki, Tsujido, Fujisawa-shi, Kanagawa-ken; Hidetaka Ohse, Soka-shi, Saitama-ken; Satoshi Ohshima; Yasunori Kiriki, Meguro-ku, Tokyo, all of Japan

[73] Assignee: Agency of Industrial Science and Technology, Tokyo, Japan

[22] Filed: Feb. 10, 1970

[21] Appl. No.: 10,146

[52] U.S. Cl. ............... 208/152, 208/143, 208/157
[51] Int. Cl. .......................................... C10g 23/10
[58] Field of Search...... 208/108, 143, 146, 152, 157, 208/213

[56] References Cited

UNITED STATES PATENTS

| | | | |
|---|---|---|---|
| 2,662,091 | 12/1953 | Odell | 208/157 |
| 3,207,689 | 9/1965 | Van Driesen | 208/152 |
| 3,278,417 | 10/1966 | Van Driesen | 208/108 |

*Primary Examiner*—Herbert Levine
*Attorney*—Ernest G. Montague

[57] ABSTRACT

Hydrogenation treatments of hydrocarbon oil is carried out in a catalyst-charged reaction vessel into the lower portion of which is fed a flow of a mixture of hydrocarbon oil and hydrogen or hydrogen-containing gas. The supply velocity of the mixture is adjusted so that catalyst particles in the catalyst layer do not fluidize. At the lower portion of the reaction vessel is provided an appropriate catalyst-withdrawing means by which deactivated catalyst particles are withdrawn during reaction.

2 Claims, 3 Drawing Figures

HYDROGENATION TREATMENT OF HYDROCARBON OIL

This invention relates to a process for using catalyst particles to subject hydrocarbon oils to various hydrogenation treatments such as hydrogenation, hydrocracking, hydrodesulfurization and hydroforming.

Generally, the hydrogenation reaction is effected by passing a mixture of a hydrocarbon oil to be treated together with hydrogen or hydrogen-containing gas through a fixed bed packed with a hydrogenation catalyst at a temperature of 300° – 500°C, and a pressure of 50 – 250 kg/cm².

Hydrocarbon oil feeds generally contain metallic constituents poisonous to catalysts such as vanadium and nickel, and these poisonous constituents cause lowering in the catalyst activity during long operation. Further, during the reaction carbonaceous matters deposit on the catalyst surface and are tightly fixed thereto, thus causing agglomeration of catalyst particles and lowering in the catalyst activity. Accordingly, when the reaction is carried out in a fixed bed, care is taken to prevent a decrease in yields. For instance, a catalyst which is unlikely to exhibit a decrease in activity is used, or when the activity decreases, the reaction temperature is elevated. Elevation of the reaction temperature, however, accelerates occurrence of side-reactions and hence, deposition of carbonaceous matters on the catalyst surface increases, with the result that the loss becomes all the greater. The catalyst having a lowered activity is taken out from the reaction vessel and done away with, or regenerated for further use. The reaction vessel of the fixed bed type, however, has a fatal defect in that the reaction must be interrupted every time the catalyst is added or taken out.

With a view to overcoming the above defect, the catalytic treatment of hydrocarbon oil using a catalyst in a fluidized bed has been proposed and attracts great attention in the art as a process suitable for industrialization. An example of one of such process the so-called H-oil process (Japanese Pat. No. 522,449). According to this process, the reaction is effected while keeping catalyst particles in the state of random motion by fluidizing the catalyst particles so that they occupy a volume 10 – 50 percent greater than the volume of the bed in the non-agitated and settled state. Thus the withdrawal of the catalyst is made possible even during the reaction. However, this process is defective in the following points. Firstly, since the catalyst bed is in the expanded condition, the size of the reaction vessel must be made larger. Secondarily, since catalyst particles are kept in a violently fluidized and mingled state by the random motion thereof, when fresh particles are added to the bed and old particles are taken out therefrom, some of the fresh particles are inevitably discharged together with old particles, with the result that such fresh particles are unnecessarily regenerated or done away with together with old particles and hence, the economical loss is great. The defect may be avoided if all of the catalyst particles are taken out after the operation has been continued for a certain period of time. However, if renewal of catalyst particles is effected in such manner, the reaction must be interrupted and the advantage inherent in the fluidized process, namely, continuous operation, is completely lost.

Further, since all of the catalyst particles are placed in the fluidized state in a reaction vessel, a great amount of liquid must be cycled under severe high-temperature and high-pressure conditions, which requires the use of a pump of great size and power, wearing of inner walls of the reaction vessel is extreme. This involves much expense for maintenance and operation of the reaction.

An object of this invention is to provide a process for the hydrogenation treatment of hydrocarbon oils which can be industrialized with great advantages and can overcome various defects involved in conventional fixed bed type and fluidized bed type processes.

Another object of this invention is to provide a process for the hydrogenation treatment in which the capacity of the pump can be lessened because the catalyst to be used need not be fluidized.

Still another object of this invention is to provide a process for the hydrogenation treatment which can increase the space-time yield of the product because the catalyst is packed very densely in the reaction vessel.

Still another object of this invention is to provide a process for hydrogenation treatment which can greatly elevate the efficiency of the catalyst by successively taking out from the lower portion of the reaction vessel the catalyst whose activity has decreased and allowing the catalyst which had been added from the upper portion of the reaction vessel to gradually descend in the reaction vessel with no substantial mixing of catalyst particles with one another.

Still another object of this invention is to provide a process for hydrogenation treatment in which the reaction liquid is fed from the lower portion of reaction vessel so that it first comes in contact with the catalyst whose activity has been lowered thus causing substances which are likely to deposit to be filtered at this primary stage, with the result that the catalyst at the upper portion suffers almost no contamination.

With the above and other objects in view which will become apparent in the following detailed description, the present invention will be clearly understood in connection with the accompanying drawing, in which.

Generally speaking, when the hydrogenation is effected by fluidizing catalyst particles within the hydrocarbon oil in the reaction vessel, a mixed flow of the hydrocarbon oil and hydrogen-containing gas (hereinafter referred to as "reaction liquid") is fed from the lower portion of the reaction vessel charged with catalyst particles, and the linear velocity of the upward flow of the reaction liquid is so determined as to put the catalyst particles into a state of violet and turbulent motion and to expand the volume of the bed which the catalyst occupies as compared with the catalyst volume when it is in the stationary state. When the linear velocity of the upward flow of the reaction liquid is too low, catalyst particles settle in the reaction liquid and deposit in the reaction vessel.

Figure 1:
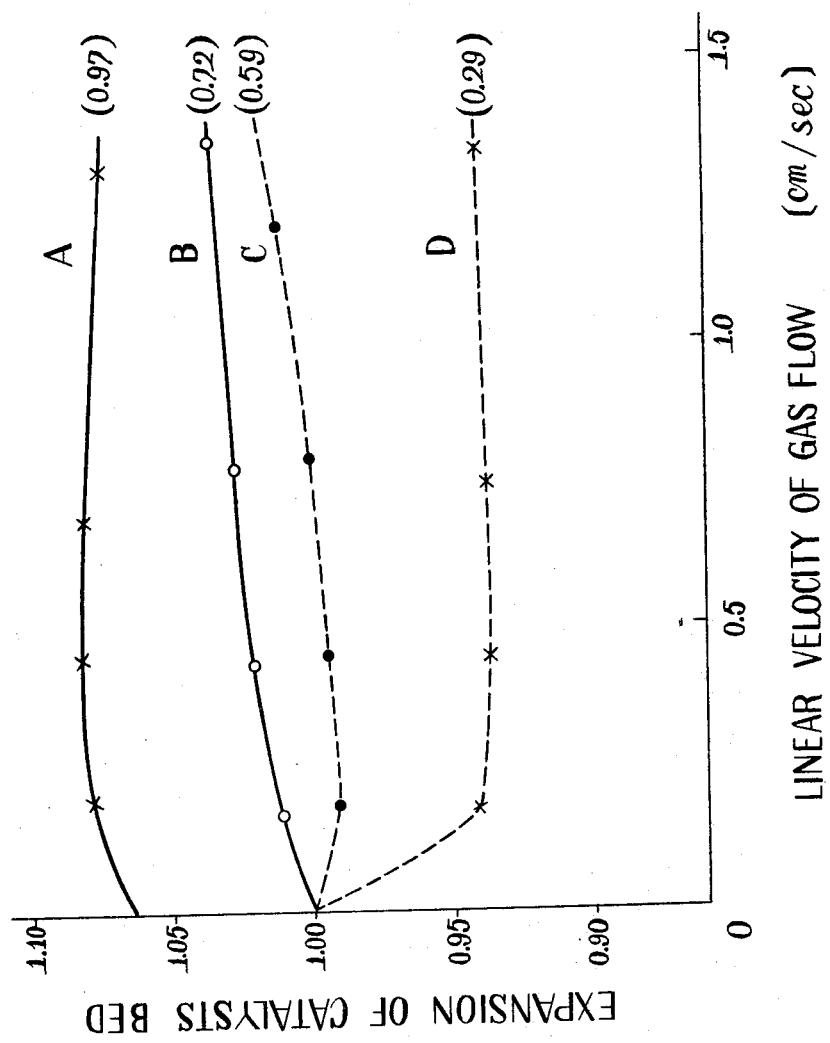
FIG. 1 is a graph illustrating curves showing the relation between the linear velocity of the reaction liquid and the expansion of the catalyst bed.

Now, the relation between the linear velocity of the upward flow of the reaction liquid and the expansion of the catalyst bed will be explained by referring to FIG. 1. When hydrogen or a hydrogen-containing gas (hereinafter referred to as "gas") is not blown to the reaction vessel and only the hydrocarbon oil is fed thereto, the catalyst bed is not expanded until the linear velocity reaches a certain level. In FIG. 1, the point 1.00 on the ordinate denotes the height of the catalyst bed attained in case the gas is not fed and the linear velocity of the hydrocarbon oil is gradually decreased and stopped. This is the "self-consolidation state" of the catalyst and a bed in this state is hereinafter to referred as "the stationary bed."

Curve A shows the relation between the amount of the gas blown and the expansion of the bed when the hydrocarbon oil is fed into the reaction vessel at a linear velocity of 0.97 cm/sec. Curves B, C and D show the same relation at the linear velocities of the hydrocarbon oil of 0.72 cm/sec, 0.59 cm/sec and 0.29 cm/sec, respectively. At a low linear velocity of the hydrocarbon oil feed, the catalyst bed is not expanded at all, as is apparent from curves B, C and D, even if the linear velocity varies to some extent. As is shown in curve A, however, at a linear velocity of 0.97 cm/sec the catalyst bed is expanded. When the gas is fed together with the hydrocarbon oil, the catalyst bed is further expanded. However under these conditions no fluidization of the catalyst particles is observed and it is thus possible to adjust the linear velocity of the reaction liquid to a level which causes a slight expansion of the catalyst bed but does not cause any mixing of the catalyst particles.

On the contrary, at too low a linear velocity of the hydrocarbon oil, as is shown in curve D, the blow-in of the gas results in diminishment of the height of the catalyst bed and it becomes lower than the height of the stationary bed. The cause of this phenomenon is the same as the cause of the apparent decrease in the volume of a powder which has been quietly poured into a cylinder when a shock is given thereto. More specifically, bubbles rise in the continuous phase of the liquid in the catalyst bed which retains the height of the stationary bed and hence, the kinetic energy of the bubbles gives a shock to the catalyst particles which are packed very coarsely and the particles are thereby forced into a more compact state.

In the present specification the term "released bed" refers to catalyst beds ranging from a bed in which the catalyst particles are in the state of having been packed by the movement of bubbles, to a bed in which, although the bed is expanded by the flow of the reaction liquid the catalyst particles are not fluidized. The ratio of the volume of the released bed to the volume of the stationary bed ranges between about 0.9 and 1.1. It has been found that in the released bed as mixing of the catalyst particles is almost non-existent, a great advantage is brought about with respect to the gas distribution. More specifically, even if a gas distributor of a specific structure is not provided, catalyst particles in the densely packed state can act as a gas distributor, and when the gas is introduced in haphazard manner, it will be finely dispersed while it passes through the layer of the catalyst particles and at the same time dispersed bubbles will be prevented from coalescing. As a result of experiments in hydrodesulfurization of topped crude oil and the like by employing such released bed, it has been confirm that no agglomeration or solidification of catalyst particles is caused under conditions adopted for hydrodesulfurization of topped crude oil.

Figure 2:
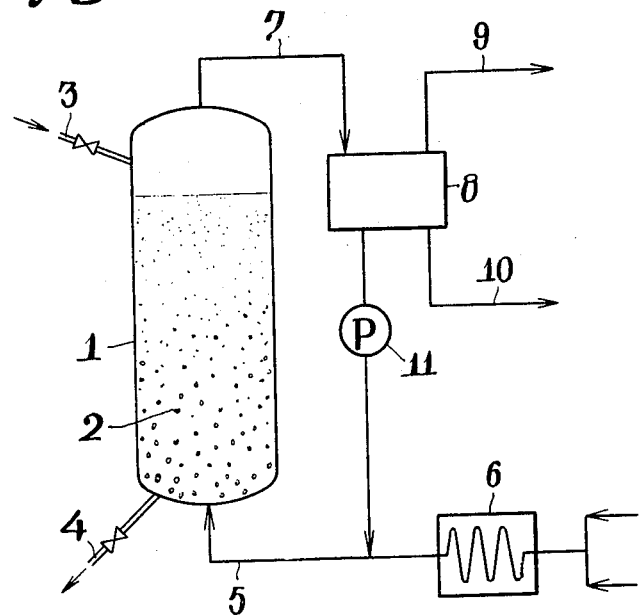
FIG. 2 is a flow sheet showing one embodiment of the hydrodesulfurization treatment system suitable for the practice of the present invention.

FIG. 2 is one example of a flow sheet illustrating the hydrodesulfurization treatment according to the present invention. In the drawing, the reaction liquid preheated to a prescribed temperature at a preheating chamber 6 is fed through pipe 5 into the lower portion of reaction vessel 1 provided with catalyst-feeding pipe 3 at its upper portion. The linear velocity of the reaction liquid is adjusted by means of pump 11 in a manner such that the height of catalyst bed 2 is expanded or diminished within a range which will substantially produce the released bed defined hereinabove.

The reaction liquid which has been subjected to the hydrodesulfurization treatment is forwarded to separator 8 through pipe 7. In the separator 8 the gas phase and the liquid phase are separated from each other, the gas phase being taken out from the system through pipe 9 and treated by a conventional method to recover hydrogen, hydrocarbon gas, gasoline and the like. The so recovered hydrogen may be recycled to the system together with fresh hydrogen. A part of the liquid phase separated by separator 8 is taken out from pipe 10 and treated in a conventional manner to obtain a product oil. The remaining unreacted liquid is recycled to the lower portion of reaction vessel 1 through pipe 5 together with fresh reaction liquid.

In the lower portion of the reaction vessel 1, there is provided pipe 4 for withdrawing the catalyst which connects a catalyst-withdrawing device. Catalyst particles are withdrawn continuously or intermittently by this pipe 4. One embodiment of the catalyst-withdrawing device is shown in FIG. 3.

Figure 3:
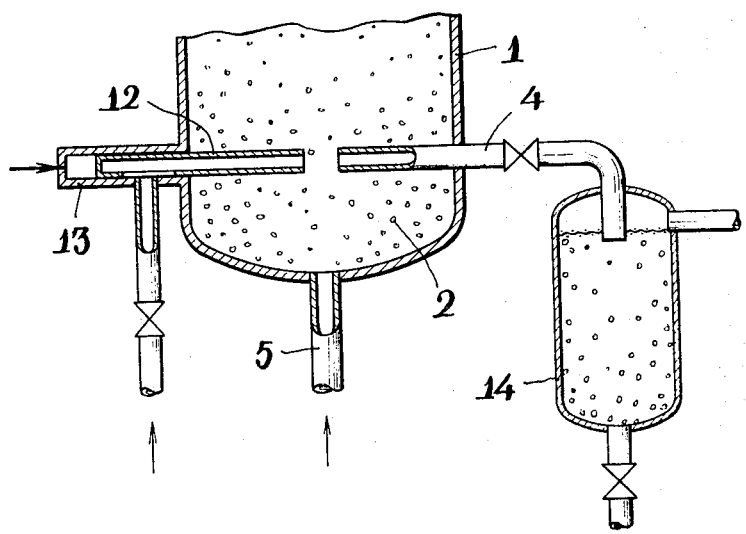
FIG. 3 is a sectional side view of the reaction vessel of FIG. 2 to which is adapted a catalyst-withdrawing device.

In FIG. 3, discharge pipe 12 supported by supporting pipe 13 is disposed to confront catalyst-withdrawing pipe 4. Said discharge pipe 12 is made slidable in supporting pipe 13 by a suitable means, and the distance between the discharge pipe and the catalyst-withdrawing pipe is adjusted by the sliding movement of the discharge pipe. The other end of catalyst-withdrawing pipe 4 is connected with catalyst recovery vessel 14 through valve, in which the catalyst sucked through pipe 4 is recovered and contained. The other end of the discharge pipe 12 is connected with the discharge side of pump (not shown), and the reaction liquid or other liquid is discharged therefrom.

Catalyst particles present between the catalyst-withdrawing pipe and the discharge pipe are sucked into the catalyst-withdrawing pipe by the action of the discharging of liquid from the discharge pipe. Thus, the catalyst can be easily taken out from the catalyst layer maintained in the state of the released bed. Further, when it is necessary to wash the catalyst-withdrawing pipe, the discharge pipe is slid toward the catalyst-withdrawing pipe to bring them into contact with each other and the liquid alone is forced into the catalyst-withdrawing pipe. Catalyst particles adhering to the inner surface of the pipe can thereby be removed sufficiently. Fresh particles of catalyst are fed to reaction vessel 1 through catalyst feed pipe 3 provided at the upper portion of reaction vessel depending on the amount of the catalyst discharged.

In the embodiment shown in FIG. 3 the discharge pipe and the catalyst-withdrawing pipe are disposed to confront each other in horizontal direction of reaction vessel, but they may be disposed in the axial direction.

When the reaction is effected, as described above, by feeding the reaction liquid from the lower portion of the reaction vessel at a suitable linear velocity to produce the released bed, the catalyst particles can be kept substantially in the stationary state even at the upper limit of the above-defined expansion range of the released bed, with the result that older catalyst particles are discharged in consecutive order from the catalyst-withdrawing pipe provided at the lower portion of the reaction vessel.

Further, in a preferred embodiment, the sectional area of the reaction vessel is decreased toward the lower portion thereof. When the reaction liquid is fed from the lower portion of the reaction vessel at a linear velocity sufficient to produce a released bed, in the major portion of the reaction vessel the catalyst is kept in the stationary state but in the lower portion of the reaction vessel there is formed a fluidized bed because the sectional area of the reaction vessel at the lower portion is smaller than that at the upper portion. The so fluidized catalyst particles can be more easily discharged from the reaction vessel through the catalyst-withdrawing device. And, when the density of the catalyst particles is lowered in said fluidized bed portion, particles present just above said portion are successively allowed to descend, fluidized and then discharged. Thus, from the fluidized bed are always discharged only old catalyst particles whose activity has been decreased. Other particle compensating for the discharged particles are allowed to shift to the fluidized bed from the stationary bed.

As detailed herein above, the reaction is effected by feeding the reaction liquid from the lower portion of the reaction vessel at a linear velocity sufficient to produce a released bed of catalyst, while the catalyst is successively discharged from the lower portion of the reaction vessel. Thus, the catalyst is kept substantially in the stationary state, and the catalyst fed from the upper portion of the reaction vessel descends in the reaction vessel gradually, and reacts with the reaction liquid in the lower portion of the reaction vessel where it comes into contact with substances likely to deposit on the catalyst, and is thereafter discharged from the reaction vessel. Accordingly, catalyst particles present in the upper portion of the reaction vessel suffer almost no contamination from such substances.

The following Examples are further illustrative of this invention, and it will be understood that the invention is not limited thereto.

EXAMPLE 1

Khafji topped crude was subject to a hydrosulfurization under the following conditions.

| | |
|---|---|
| Pressure (kg/cm$^2$) | 200 |
| Temperature (°C) | 390 |
| Liquid Hourly Space Velocity vol/hr./vol | 1.0 |
| Oil Recycle Ratio (Rate of recycle oil/Rate of fresh feed oil) | 1.68 |
| Hydrogen Rate, Fresh Feed (NM$^3$/kl) | 160 |
| Recycle (NM$^3$kl) | 800 |
| Velocity of reaction liquid in the reactor (l/min/cm$^2$) | 0.026 |
| Expansion of Catalyst Bed | about 0.96 |
| Catalyst Components | MoO$_3$-CoO-Al$_2$O$_3$ |
| Form and Size | bead 1.2mm |

Table 1 shows the results obtained after 250 hours from the initiation of the reaction.

TABLE 1

| | Raw Material | Product |
|---|---|---|
| Specific Gravity (d'$_4^5$) | 0.975 | 0.929 |
| Viscosity (cst. at 50°C) | 402.6 | 148.2 |
| IBP (°C) | 300 | 180 |
| 10% (°C) | 341 | 328 |
| 300°C + (vol %) | — | 96.1 |
| Sulfur content (wt %) | 4.26 | 1.07 |
| Desulfurization (%) | | 76.4 |

EXAMPLE 2

Kuwait topped crude containing the components shown in Table 2 was subject to hydrocracking under the following conditions.

| | |
|---|---|
| Temperature (°C) | 440 |
| Pressure (kg/cm$^2$) | 140 |
| Liquid Hourly Space Velocity vol/hr./vol | 0.6 |
| Hydrogen Recycle Ratio (NM$^3$/kl) | 840 |
| Oil Recycle Rate | 2.95 |
| Velocity of reaction liquid in the reaction vessel (l/min/cm$^2$) | 0.020 |
| Expansion of Catalyst Bed | about 0.95 |
| Catalyst Components | 2.5mm Extrudate, MoO$_3$-CoO-Al$_2$O$_3$ |

TABLE 2

Components contained in Kuwait topper crude (Specific Gravity 0.959)

| | |
|---|---|
| Sulfur content | 3.9 weight % |
| Vanadium | 45 ppm |
| Nickel | 15 ppm |

Table 3 shows the results obtained by the hydrocracking.

TABLE 3

| Products | | wt % | Specific Gravity | Sulfur Component |
|---|---|---|---|---|
| H$_2$S | | 3.8 | — | |
| Gaseous | C$_1$ | 1.6 | — | |
| | C$_2$ | 1.8 | — | |
| | C$_3$ | 1.7 | — | |
| Naphtha | C$_4$ below 200°C | 22.5 | 0.739 | |
| Kerosene | 200°C to 300°C | 25.1 | 0.816 | 0.01 |
| Residue | over 300°C | 43.5 | 0.916 | 0.82 |

We claim:

1. A process for the hydrogenation reaction treatment of hydrocarbon oils which comprises the steps of forming a released bed of homogeneous catalyst particles constituting a state with no substantial mixing and fluidization of said catalyst particles in a substantially stationary not fluidized condition in a reaction vessel by adjusting the linear velocity of the hydrocarbon oil reaction liquid fed from the lower portion of the reaction vessel, forming f fluidized bed of said catalyst at the bottom and adjacent to said released bed, effecting the hydrogenation of said hydrocarbon oil reaction liquid in the so formed released and fluidized beds, and continuously withdrawing deactivated catalyst from said released bed from the bottom of said reaction vessel while said reaction is in progress, and supplying fresh catalyst from an upper portion of said reaction vessel to the top of said released bed.

2. The process, as set forth in claim 1, further comprising the steps of
forming a fludized bed region exclusively adjacent the bottom of said reaction vessel, and
withdrawing said deactivated catalyst from said fluidized bed region.

* * * * *